United States Patent [19]

Yarusso et al.

[11] Patent Number: 5,858,150
[45] Date of Patent: Jan. 12, 1999

[54] PRESSURE-SENSITIVE ADHESIVE BASED ON PARTIALLY ORIENTED AND PARTIALLY CRYSTALLIZED ELASTOMER

[75] Inventors: David J. Yarusso, Shoreview; Patrick D. Hyde, Burnsville, both of Minn.

[73] Assignee: Minnesota Mining and Manufacturing Company, St. Paul, Minn.

[21] Appl. No.: 855,693

[22] Filed: May 14, 1997

Related U.S. Application Data

[62] Division of Ser. No. 574,246, Dec. 18, 1995, abandoned.

[51] Int. Cl.[6] ............................... B32B 25/12; C08C 4/00
[52] U.S. Cl. ..................... 156/163; 156/160; 156/229; 156/237; 156/334; 156/338; 427/208.4; 427/398.1; 427/398.2; 427/505; 427/516; 526/348.1; 528/502 R; 528/502 F; 528/503; 528/931
[58] Field of Search ..................... 427/505, 516, 427/208.4, 398.1, 398.2; 156/160, 163, 164, 199, 229, 237, 334, 338; 528/502 R, 502 B, 502 F, 503, 931; 526/348.1

[56] References Cited

U.S. PATENT DOCUMENTS

| | | | |
|---|---|---|---|
| 3,783,072 | 1/1974 | Korpman | 156/338 X |
| 4,147,831 | 4/1979 | Balinth | 428/356 |
| 4,166,706 | 9/1979 | Korpman | 400/696 |
| 4,731,282 | 3/1988 | Tsukagoshi et al. | 428/343 X |
| 4,842,022 | 6/1989 | Oxley et al. | 428/57 X |
| 4,857,372 | 8/1989 | Ginkel et al. | 428/42 |
| 4,906,421 | 3/1990 | Plamthottam et al. | 264/22 |
| 5,156,911 | 10/1992 | Stewart | 428/355 |
| 5,192,612 | 3/1993 | Otter et al. | 428/355 |
| 5,274,036 | 12/1993 | Korpman et al. | 525/92 |
| 5,296,277 | 3/1994 | Wilson et al. | 428/40 |
| 5,328,653 | 7/1994 | Hyde et al. | 264/284 |
| 5,346,766 | 9/1994 | Otter et al. | 428/355 |

FOREIGN PATENT DOCUMENTS

| | | |
|---|---|---|
| 0 352 901 | 1/1990 | European Pat. Off. . |
| HEI 7-18227 | 1/1995 | Japan . |
| WO 94/11175 | 5/1994 | WIPO . |

OTHER PUBLICATIONS

R. Clarke et al., "Temperature Switchable Pressure Sensitive Adhesives," *Adhesives Age*, pp. 39–41, Sep. 1993.

F. Mirabella, "A Critical Evaluation of Internal Reflection Spectroscopic Methods for Determining Macromolecular Orientation in Polymer Surfaces," *J. Applied Spectroscopy*, vol. 42, No. 7, pp. 1258–1265, 1988.

F. Mirabella, "Surface Orientation of Polypropylene. I Theoretical Considerations for the Application of Internal Reflection Spectroscopy," *J. Polymer Science,* Polymer Physics Edition, vol. 22, pp. 1283–1291, 1984.

F. Mirabella, "Surface Orientation of Polypropylene. II. Determination for Uniaxially and Biaxially Orientaed Films Using Internal Reflection Spectroscopy," *J. Polymer Science*, Polymer Physics Edition, vol. 22, 1293–1304, 1984.

Exxon Chemical Company brochure entitled "Escorez® 1310 LC Petroleum Hydrocarbon Resin".

Exxon Chemical Company brochure entitled "Vistanex® Polyisobutylene" 1986.

Exxon Chemical Company brochure entitled "VISTANEX® Polyisobutylene Properties and Applications," 1974.

S.D. Gehman, "The Contribution of X–Ray Research to the Knowledge of Rubbers," *Chemical Reviews,* vol. 26(2), pp. 203–225, 1940.

Taylor et al., "Birefringence and Crystallization in Elastomers," *Journal of Applied Physics*, vol. 26, No. 9, pp. 1075–1979, 1955.

J.E. Field, "An X–Ray Study of the Proportion of Crystalline and Amorphous Components in Stretched Rubber," *Journal of Applied Physics*, vol. 12, pp. 23–34, 1941.

"Elastomers Synthetic," *Encyclopedia of Polymer Science and Engineering*, Index Volume, pp. 106–107, 1990.

"Isobutylene Polymers," *Encyclopedia of Polymer Science and Engineering*, vol. 8, pp. 423–448, 1987.

"Orientation," *Encyclopedia of Polymer Science and Engnineering*, vol. 10, pp. 595–618, 1987.

"Rheooptical Properties," *Encyclopedia of Polymer Science and Engineering*, vol. 14, pp. 552–565, 1988.

"Rubber Natural," *Encyclopedia of Polymer Science and Engineering,* vol. 14, 2d Ed., 1988, pp. 687–716, 1988.
"Rubber Derivatives," *Encyclopedia of Polymer Science and Engineering,* vol. 14, pp. 762–764, 1988.

*Primary Examiner*—Fred Teslein
*Attorney, Agent, or Firm*—Doreen S. L. Gwin

[57] ABSTRACT

A pressure-sensitive adhesive comprises an elastomer having a partially oriented and partially crystallized elastomer component. Articles comprising the pressure-sensitive adhesive on a backing or substrate are also disclosed, as are methods of preparing the adhesive and the articles.

21 Claims, 3 Drawing Sheets

PRESSURE-SENSITIVE ADHESIVE BASED ON PARTIALLY ORIENTED AND PARTIALLY CRYSTALLIZED ELASTOMER

This is a division of application Ser. No. 08/574,246 filed Dec. 18, 1995 abandoned.

BACKGROUND OF THE INVENTION

1. Field of the Invention

This invention relates to pressure-sensitive adhesives, articles comprising substrates or backings coated with such adhesives, a hot-melt process for preparing such adhesive-coated backings, and the use of such articles. More specifically, this invention relates to pressure-sensitive adhesives having a partially oriented and partially crystallized elastomer component which, in a particularly preferred embodiment, imparts anisotropic peel behavior to the adhesive.

2. Description of the Related Art

Pressure-sensitive adhesives ("PSAs") are typically provided in the form of a tacky adhesive coating that is disposed on a backing (e.g., a tape or a sheet made of polymeric film, metal foil, paper, cloth, release liner, etc.). Such adhesives are useful for adhesively bonding two surfaces together with light finger-pressure, so as to form a relatively weak bond that usually can be easily broken by peeling the adhesive-coated tape or sheet to remove it from the surface to which it is attached. Preferably the adhesive-coated tape or sheet can be removed without damaging the surface and without leaving adhesive residue behind. A PSA article commonly used today is Scotch™ brand masking tape made by the 3M Company, which began using rubber-based PSAs for such articles in the late 1920s.

A solvent-free, hot-melt process for preparing a PSA from a tackified non-thermoplastic elastomer, such as natural rubber, polyisobutylene, and other hydrocarbon elastomers, is described in the PCT international patent application (of the assignee hereof) published May 26, 1994 as WO 94/11175. The process uses a continuous compounding device that has a sequence of alternating conveying zones and processing zones which masticate the elastomer and mix the elastomer, tackifier, and adjuvants to form the adhesive. Molten adhesive may be pumped through a coating die in the form of a thin film and directly onto a support which preferably comprises a moving web that passes around a heated coating roll.

Japanese kokai patent application no. HEI 7[1995]-18227, published Jan. 20, 1995, describes anisotropic adhesive material having an adhesive layer on at least one side of a base having anisotropic flexibility and corrugated or cord-like structure.

U.S. Pat. No. 5,156,911 (Stewart), issued Oct. 20, 1992, discloses skin-activated, temperature-sensitive adhesive assemblies. In one embodiment there is an adhesive that is substantially non-tacky at or below room temperature, becomes aggressively tacky at skin temperature, but reverts to its substantially non-tacky condition upon cooling (e.g., by applying ice or a cold pack). Regardless of the embodiment, the adhesive includes a crystallizable polymer that may be crosslinked. Similar materials are described by R. Clarke et al. in "Temperature Switchable Pressure Sensitive Adhesives," *Adhesives Age*, September, 1993, pp. 39–41.

There is a desire for adhesives that have anisotropic peel behavior (i.e., different adhesion when peeled in different directions). Such adhesives would be useful in many applications (e.g., graphic application tapes and other uses described more fully below). If an adhesive article having such properties could be provided independent of a backing, substantial flexibility in backing selection would be possible. It would also be desirable if a known adhesive composition could be manufactured in a manner to provide such properties. There is also a desire for adhesives having heat activatable tack as these would be useful in situations where low initial tack is advantageous, especially if known adhesive compositions can be manufactured in a manner to provide such properties.

SUMMARY OF THE INVENTION

In one aspect, the present invention provides a pressure-sensitive adhesive comprising a partially oriented and partially crystallized elastomer. Preferably, the molecular repeat units of the elastomer are partially directionally oriented and exhibit partial crystallinity. By "partially oriented" it is meant that the elastomer is sufficiently oriented that the orientation can be revealed by optical birefringence, infrared dichroism, or x-ray diffraction. By "partially crystalline" it is meant that the elastomer has sufficient crystallinity to be detected by differential scanning calorimetry or X-ray diffraction.

Varying the degrees or extents of orientation and crystallinity in the elastomer can advantageously influence the properties of the PSA. For example, in one embodiment of this invention, the orientation and crystallinity of the elastomer are sufficient to impart anisotropic peel forces to a PSA article (e.g., a substrate or backing on which the PSA is coated). The anisotropic peel force is an unusual property because the force necessary to peel the PSA article from a surface to which it is adhered varies when measured along different axes. That is, the PSA article displays different adhesion when peeled from the surface in different directions. The degrees of orientation and crystallinity of the elastomer can be sufficient to cause (1) the peel force measured in the direction parallel to the preferred orientation to be substantially less than that observed for a PSA of the same formulation but whose elastomer is not oriented, and to cause (2) the peel force measured in the direction perpendicular to the preferred orientation to be substantially greater than that measured in the parallel direction. Generally, the peel force in the parallel direction will be less than 90%, preferably less than 50%, and most preferably less than 10%, of the higher peel force (i.e., the peel force in the perpendicular direction).

When the PSA article is made by extruding the adhesive, the preferred orientation of the elastomer will generally be the "machine direction" (or "MD"), that is, parallel to the extrusion coating line. The direction perpendicular to the extrusion coating line is generally referred to as the "cross direction" (or "CD"). For example, in the case of PSA-coated tape made by extruding a hot melt of tackified-natural rubber PSA onto a continuously moving web backing, the peel force of the tape is substantially different depending on whether the tape is peeled from an adhered surface in the direction parallel to the extrusion coating line (the machine direction) or the cross direction (i.e., the direction perpendicular or transverse to the extrusion coating line).

Generally, the ratio of the peel force in the machine direction to the peel force in the cross direction is less than 1, more preferably about 0.9 to 0.002. However, heating the anisotropic PSA to a temperature above the melting point of oriented, crystalline regions of the elastomer irreversibly converts the PSA to an essentially or substantially isotropic state, the ratio of the MD peel force to the CD peel force being essentially 1.

The unique anisotropic peel force property enables PSA articles of the invention (e.g., PSA-coated tapes or sheets) to be advantageously used in graphic arts applications, (e.g., a premask tape, a prespace tape, a graphic art film, die-cut products, or dry transfer lettering, such as the graphic arts products described by Satas, supra, Chap. 32). The anisotropic PSA articles of this invention can also be used as a diaper fastening tape, a wall decoration film, or other constructions wherein differential peel is desirable.

As the degrees of orientation and crystallization in the elastomer increase, they become sufficient to impart to the PSA tack and peel resistance which are relatively low in both the machine and cross directions (and much lower than that of a PSA having the same formulation but in which the elastomer is non-oriented and non-crystalline). However, when such a low-tack embodiment of the PSA is heated above the melting point of the oriented, crystalline elastomer the elastomer crystals melt, the orientation relaxes, and the adhesive properties (tack and peel resistance) irreversibly convert to the higher tack and peel resistance typical of conventional PSAs of the same formulation. Where the degrees of orientation and crystallinity are sufficient to produce relatively low tack and low peel force in both the machine and cross directions, these two adhesive properties will increase upon heating and become essentially or substantially the same in both the machine and cross direction. That is, the PSA layer will become isotropic.

In another embodiment, a PSA article of this invention with an initially low-tack adhesive layer is selectively heated to provide a pattern of spatially-varying regions of high and low tack to control the adhesive force of the article.

The invention also relates to various processes, such as a process of bonding one or more substrates or objects together by applying the PSA to the bonding surfaces. Another aspect of the invention provides a process of transferring one or more objects from one location to another location, by applying to the surfaces of such objects the PSA, and transferring the resulting bonded product to the other location.

In another aspect of this invention, a PSA article is made by a solvent-free, hot-melt process which can use, for example, the compounding devices, pumps, dies, and coating rolls which are described in published PCT application WO 94/11175, which description is incorporated herein by reference.

The process of making a PSA of this invention, in one aspect, comprises (a) masticating or milling a normally solid, undeformed, uncured elastomer capable of orientation and strain-induced crystallization, such as uncured natural rubber or polyisobutylene; (b) optionally, blending such elastomer with tack-inducing additives; (c) heating the masticated elastomer or elastomer/tackifier blend above room temperature (>23° C.) to form a hot, tacky substance; (d) shaping by shearing, elongating, stretching or extending the hot substance to induce stress and strain therein, thereby partially molecularly orienting the elastomer; and (e) cooling or quenching the resulting hot, oriented composition to a temperature below the melt temperature of the oriented elastomer and at a cooling rate fast enough to induce partial crystallization in the elastomer in its oriented state.

The hot, tacky substance can be stretched or extended by extruding it, for example through the slot of an extrusion die. The film-extrudate can be coated or deposited on a backing, such as a biaxially-oriented polyester film or a release surface, and then cooled, thereby providing a PSA article of this invention, such as a PSA tape or sheet. The cooling can be carried out, for example, by depositing the PSA extrudate on a web (backing) conveyed by a coating roll having chilled water circulating through its interior. Alternatively, the hot, tacky elastomer-containing substance and a thermoplastic precursor of the backing can be coextruded as a laminate. The PSA extrudate coated on the backing or the coextruded laminate may be stretched and cooled to induce the partial orientation and crystallization.

The manufacturing process can affect the extents of orientation and, as a result, the properties of the PSA. For example, if the cooling rate is relatively slow, then the cooled PSA may have high tack and isotropic peel force. As the cooling rate is accelerated, the PSA will have less tack and the peel force will be more anisotropic. At relatively fast cooling rates, the cooled PSA may have quite low pressure-sensitive tack and low or imperceptible peel force. The desired rate of cooling (to produce the desired orientation, crystallization and, thus, the desired degrees of anisotropy, tack, and peel force) will vary and depends on factors such as the particular adhesive components used and the amounts thereof, the temperature of the shaped adhesive, the thickness of the PSA coating, the particular equipment and operating conditions used to make the PSA article (e.g., line speed), and the use or application to be made of the article.

In order that the PSA article have the desired heat or solvent resistance for a particular application, the PSA can be cured or crosslinked. For example, where the PSA article is a masking tape to be used in paint spraying operations and has to undergo the paint stoving process, a crosslinked PSA is particularly useful. However, crosslinking processes which involve heating may be detrimental to preserving the orientation and crystallinity in the PSA.

BRIEF DESCRIPTION OF THE DRAWINGS

The invention will be more fully appreciated with respect to the following non-limiting drawings in which.

DETAILED DESCRIPTION OF THE PREFERRED EMBODIMENTS

Figure 1:
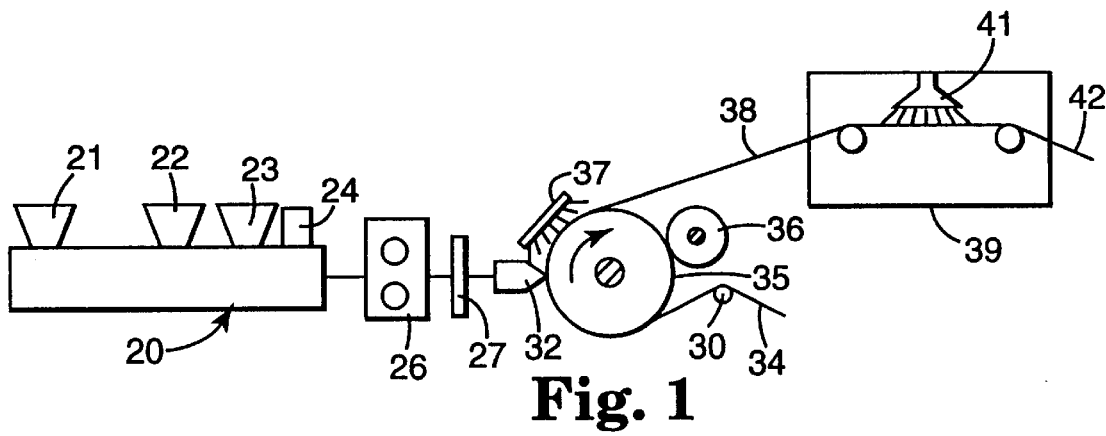
FIG. 1 is a schematic representation of one embodiment of a continuous compounding and coating line of equipment or apparatus which can be used to carry out the above-described solvent-free, hot-melt process for making PSAs and PSA articles according to this invention.

Referring now to the drawings, and initially to FIG. 1, reference number 20 generally designates a device or apparatus which can be a single unit or a series of units interconnected so as to continuously-compound or process the elastomer component of the PSA used in this invention. Device 20 can be a twin-screw extruder, such as a Werner-Pfleiderer™ co-rotating, twin-screw extruder, e.g., Model ZSK-30 or ZSK-60. Device 20 can have a sequence of alternating and interconnecting conveying and processing sections or zones. A plurality of metering hoppers 21, 22, 23, connected to a corresponding plurality of inlet openings, are provided to feed the PSA components to device 20 at controlled rates. K-Tron™ automatic loss-in-weight feeders or liquid addition devices, such as heated pail unloaders or liquid metering pumps, can be used to obtain these rates. A vent 24 can be provided at the downstream or discharge end of device 20 to release volatile substances therefrom. A melt pump 26, such as a Zenith-Nichols™ gear pump, is connected to the discharge end of device 20 to convey therefrom at a controlled rate a hot melt of the compounded PSA (i.e., molten, compounded PSA). A filter 27 can be disposed downstream of pump 26 to filter the metered hot melt and remove unwanted contaminants therefrom. Alternatively, the filter 27 can be disposed upstream of pump 26.

The molten PSA is shaped by extruding it from an opening or slot in a direct-contact coating die 32, such as a flexible blade coater with a silicone rubber wiping blade affixed to the upper side of the die slot. The die can also be a rotary rod contact die. The die deposits, coats, smears, or wipes the molten PSA extrudate as a continuous coating or film with desired thickness, e.g. 20–75 $\mu$m, onto one surface of a moving web 34. However, the PSA need not be a continuous coating on the web. It can also be provided as a longitudinally or transversely discontinuous coating or film. Web 34 provides the backing for the PSA article and may be made of any material desired, including those commonly employed as backings for pressure sensitive adhesive tapes such as biaxially-oriented polyester or polypropylene, vinyl, cloth, paper, metal foil, etc. Additionally, the web can be a release surface such as a release liner.

Shaping and straining of the elastomer component of the PSA melt occurs as it flows out of die 32 and is wiped onto web 34. Web 34 passes over a guide roll 30 and is conveyed to and from the orifice of die 32 by a cooled coating roll or drum 35. The relative positions of die 32 and coating roll 35 can be such that the PSA extrudate is deposited as shown on the surface of the roll. Roll 35 can be a chromed steel coating roll (particularly useful with the flexible blade coater) or a rubber-covered coating roll (particularly useful with the rotary rod contact die). The interior of the roll 35 can be supplied with a temperature-controlled cooling medium (e.g., circulating water) to maintain the roll temperature to effect rapid cooling or quenching of the molten of PSA extrudate to obtain the desired degrees of orientation and crystallization of the elastomer component. Cooling of the molten PSA extrudate is caused by the transfer of heat from the extrudate to the backing which is cooled by roll 35. Alternatively, when roll 35 is rubber-covered, an additional cooled roll 36 can be used for cooling the surface of roll 35 to provide the requisite quick cooling of the PSA extrudate. Alternatively, or in addition, cooling can be provided by a spray device 37 mounted or disposed above coating die 32 to spray a cooling medium, such as a mist of water or a curtain of chilled nitrogen gas, onto the surface of the molten PSA extrudate as it exits the die. A further alternative is to precool web 34 and to coat the PSA onto the cooled web (which acts as a heat sink). Another alternative is to cool the PSA-coated web 38.

The PSA-coated web 38 may be wound up and slit or otherwise cut to the desired size or configuration. As shown in FIG. 1 it may first be conveyed to a crosslinking station 39 where the PSA layer on the web is exposed to radiation from a radiation source 41. Radiation source 41 may be an electron beam (e.g., an Electrocurtain™ unit) or ultraviolet radiation. Radiation provides crosslinking of the elastomer component of the PSA and produces a cross-linked PSA-coated web 42 which may be wound up and cut to size. A release coating and/or low-adhesion backsize, such as that conventionally used on PSA tapes, may also be applied to the web, either before or after the molten PSA extrudate is deposited thereon. Other details of the compounding and coating equipment illustrated will be omitted in the interest of brevity, such details being set forth in the aforementioned PCT application WO 94/11175.

When coating on relatively thin backings (e.g., approximately 25 $\mu$m thick), an effective quenching rate to produce the PSA elastomer component in the desired oriented, crystallized state can be achieved simply by controlling the temperature of the coating roll. With thicker backings, however, it may be necessary to employ additional cooling means, such as pre-chilling the backing prior to coating it with the PSA extrudate or applying cooling in the form of a chilled liquid or gas stream directed at the surface of the extrudate immediately downstream of the coating die. Other means can be employed, however. The important thing is that the cooling rate be sufficiently fast that crystallization occurs in the elastomer before the orientation induced by the shaping and/or coating operation has relaxed.

Figure 2:
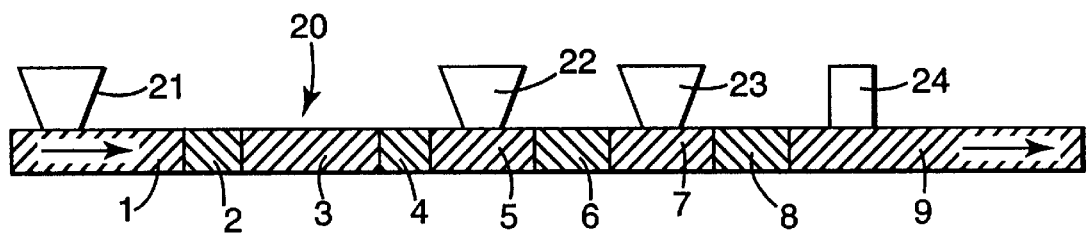
FIG. 2 is a schematic representation of one embodiment of an extruder screw design or compounding device shown in FIG. 1.

FIG. 2 illustrates the design of a screw extruder that can be used for compounding device 20 in FIG. 1. Also shown are hoppers 21, 22 and 23 which dispense the elastomer, tackifying resin, and antioxidant components of the PSA, respectively, into different extruder sections 1, 5, and 7, respectively, via inlet openings. The elastomer is kneaded or masticated in section 2, conveyed and further masticated in section 3, mixed with tackifying resin and/or other adjuvants in section 5, and mixed with antioxidant in section 7. Further mixing and mastication takes place in sections 6 and 8. The extruder screw has appropriate flights or turns to convey the PSA components from one section to a succeeding section in the direction indicated by the arrows in the upstream and downstream zones 1 and 9, respectively. The extruder screw also kneads and masticates the elastomer.

The elastomer can be supplied to device 20 as a warm mass from an external processing device. Alternatively, it can be fed in a pelletized or ground form and coated or dusted with powdered talc or other common parting agents to prevent or minimize the sticking of the elastomer to the screw or interior wall of the extruder. If aerobic processing is desired, an oxygen-containing gas, such as compressed air, can be injected (e.g., at a pressure of 5–100 psig, 30–700 kPa) into the extruder, for example, in section 3, to aid in the controlled reduction of the elastomer molecular weight and to ease processing of the PSA. During processing of the PSA and its components in the extruder, the various extruder sections are heated, e.g., to 160° C., and, optionally, other adjuvants can be added to the extruder and compounded with the elastomer and tackifying resin.

Figure 3:
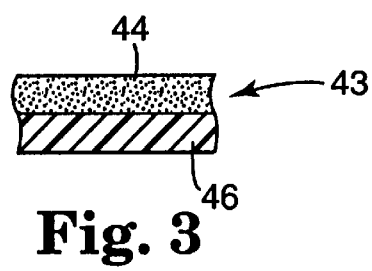
FIG. 3 is a schematic cross-section in elevation of one embodiment of a PSA article of this invention in the form of a tape or sheet.

FIG. 3 illustrates the cross-section of a PSA article 43 of this invention, such as that cut from web 38 or 42 of FIG. 1. Article 43 comprises the PSA coating 44 derived from the hot PSA extrudate, and web or backing 46 such as biaxially-oriented polyester or polypropylene.

As mentioned above, in one embodiment of the PSA article of this invention, the degrees of orientation and crystallinity of the PSA elastomer are sufficient to impart anisotropic peel force to the article. An article having anisotropic peel force may be used as a graphics application tape (including both premask and prespace tapes), which is useful in graphic arts work. For example, die-cut graphics often take the form of such vinyl decals. Typically, the decal is formed by cutting it from a sheet of colored, adhesive-coated vinyl film which has been laminated to a release liner. The waste or weed is peeled away and then a graphics application tape is applied to the top of the die-cut decals to lift them from the release liner while keeping them in register. The decals are then transferred to the desired target substrate and the graphics application tape is peeled away. Such graphics application tapes need to be aggressive enough to reliably lift all of the components of the graphic (i.e., the decals in this example) from the release liner, but still should be easily removed after transferring the graphic to the target substrate and should not pull any of the graphic off the target. This is often a difficult balance to achieve. Using the PSA tape of the present invention as the graphics application tape, one could pull in the high adhesion direction to remove the graphic from the liner, apply it to the target substrate, and then remove the graphics application tape by pulling in the low adhesion direction. Other graphics application tapes do not involve die-cut components but there would still be an advantage to having graphics application tapes with a very easy removal direction because the graphics can be very wide and difficult to pull off with conventional adhesives. When a conventional adhesive is formulated to have a low removal force, the ability to hold onto the graphic is impaired. The anisotropic PSA tapes of the present invention can have high holding ability but still have a low removal force.

Figure 4:
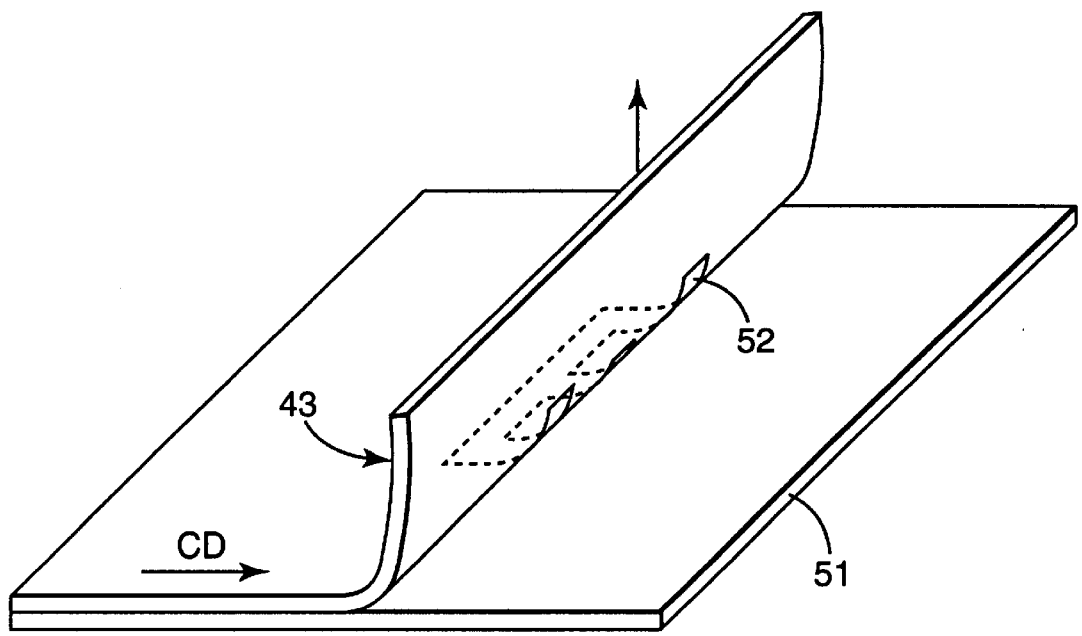
FIGS. 4 and 5 are schematic isometric views of an embodiment of a PSA article of this invention which is used as a graphic arts application tape or sheet for the transfer of letters from one substrate to another substrate.
Figure 5:
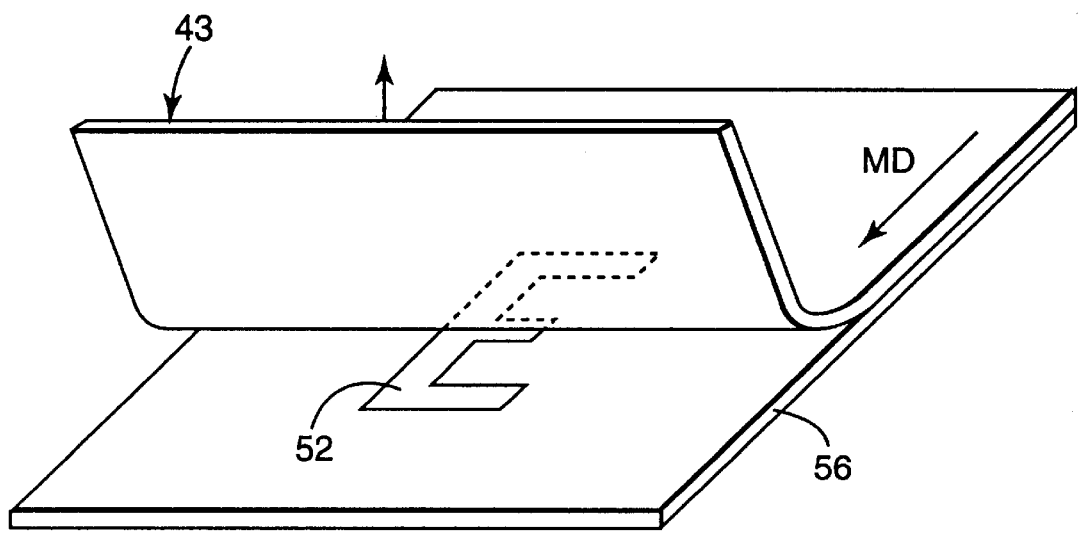
Figure 6:
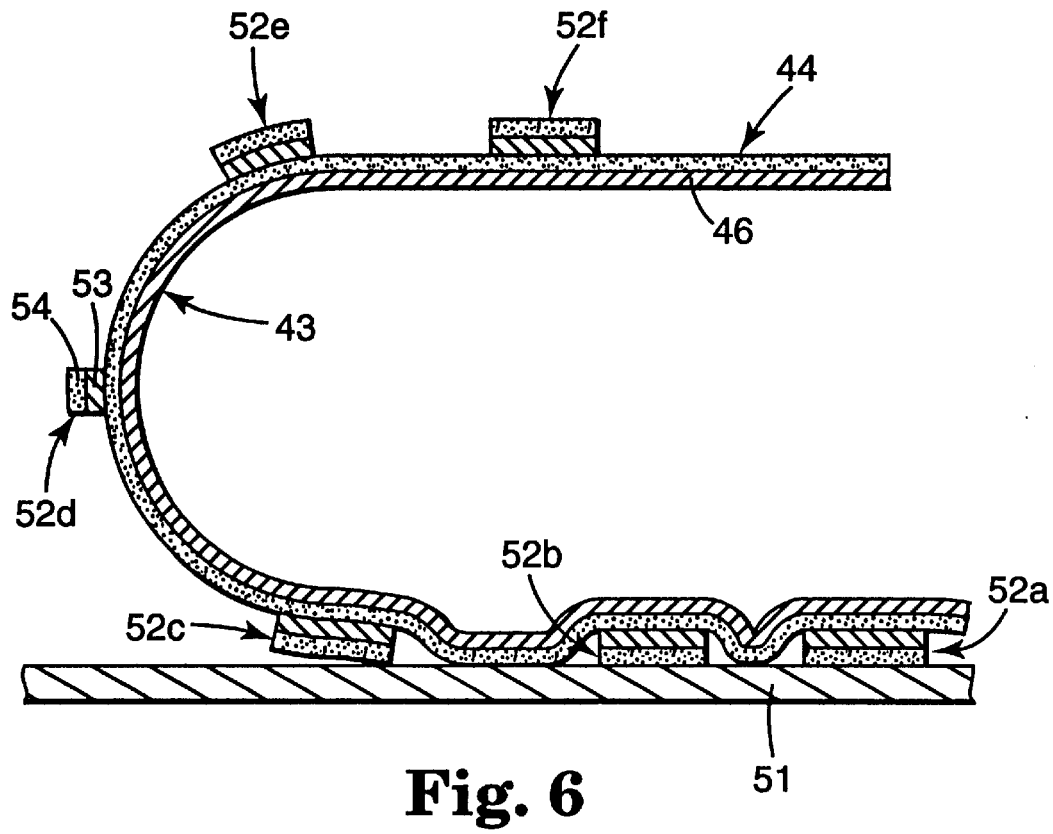
FIGS. 6 and 7 are schematic cross-sectional views in elevation of FIGS. 4 and 5, respectively.
Figure 7:
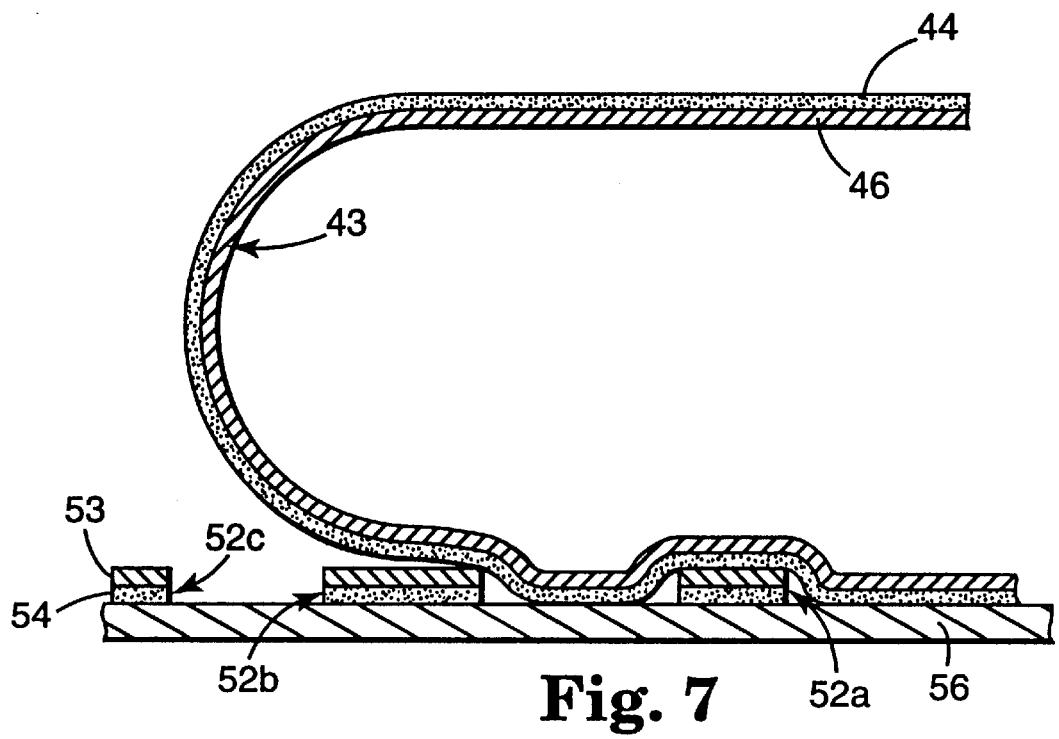

An embodiment of a graphics application article of this invention is illustrated in FIGS. 4–7. It comprises a tape or sheet generally designated 43 (a cross-sectional portion of which is also shown in FIG. 3) comprising a PSA coating 44 with anisotropic peel force on a backing 46. In FIG. 4, graphics application article 43 is shown placed on top of a release liner 51 which functioned as a substrate for PSA-coated die-cut letter 52 in the form of "E". The lower surface of graphic application article 43 is defined by the exposed surface of the PSA coating 44. By placing the article over the release liner 51 and then peeling or lifting the tape up in the direction shown in FIG. 4 by the vertical arrow (that is, the high adhesion direction or the cross direction shown by the horizontal arrow designated "CD"), the die-cut letter 52 is removed from the substrate because it adheres to PSA coating 44. This use of the graphic application article 43 is further illustrated in FIG. 6, where release liner 51 has removably mounted thereon in a desired pattern an array of PSA-coated die-cut letters 52a, 52b, 52c, 52d, 52e, and 52f, each comprising a backing 53 coated with a conventional isotropic PSA 54. FIGS. 5 and 7 illustrate how the die-cut letters 52a, etc., loaded on anisotropic graphic application article 43 of FIGS. 4 and 6, respectively, can be removed therefrom and transferred to a target substrate 56. The letter-loaded graphic application article is placed on the target substrate and the graphic application article is peeled therefrom in the direction shown in FIG. 5 by the vertical arrow, (the machine direction shown by the arrow designated "MD"). The letter 52, "E", is thus transferred to the target substrate 56, as shown in FIG. 5, and the array of letters 52a, etc., are transferred in a desired pattern to the target substrate 56 as shown in FIG. 7.

Another application in which the anisotropic peeling properties of the invention can be used is in the manufacture of diaper fastening tape. The low peel force of such a tape in the machine direction would allow a large stock roll of the tape to be unwound for converting without the aid of a release material. In the process of converting the stock roll to individual tapes, the tape could be cut so the cross direction of the stock roll, which is the high adhesion direction, becomes the direction of peel on the finished diaper product.

Yet another application of the PSA article would be in wall decoration films. One can produce a graphic wall decoration with the anisotropic PSA article in such a way that the high adhesion direction is vertical or down the wall to prevent failure due to gravity, while the low adhesion direction is horizontal to provide an easy removal direction avoiding any damage to the wall.

Another use for an anisotropic PSA article of the invention is in masking applications that use a maskant sheet or drape adhesively fixed to a substrate in order to mask a large area of the substrate. Maskant sheets or drapes are used in automotive painting or refinishing and in commercial and residential wall painting wherein a paper or plastic film is taped to the autobody part or the wall in order to prevent overspraying of a coating onto the area that is masked. If the maskant sheet is relatively long and heavy it will induce a constant peel force in the direction of the drape that may cause the tape to pull away from the substrate. The adhesive can be formulated to be more aggressive and overcome the stress induced by the weight of the drape, but the tape may then be difficult to remove completely from the substrate after the painting operation is completed. An anisotropic PSA tape of the present invention that exhibits low peel force in the machine direction and high peel force in the cross direction is useful in such masking applications. The tape can be made to have high peel resistance or holding ability in the cross direction to overcome the peel stress induced by the weight of the drape, but have only a very low peel or removal force in the lengthwise direction to remove the tape without damage to the substrate. Since heating the PSA tape could detrimentally affect its anisotropic characteristics, it is not recommended to pass the tape through a paint baking oven.

Another use for an anisotropic PSA article of this invention is as an adhesively bonded wall hook or wall hanger, e.g., for a picture frame. Such an article would have its anisotropic PSA layer positioned such that its high adhesion direction would be down the wall to prevent adhesion failure due to gravity or the weight of the picture frame. The wall hanger can be easily repositioned if desired by removing it from the wall by pulling it therefrom in the horizontal direction (in which adhesion of the PSA layer is low), and then, when the hanger is in the new, desired position, heating it, for example, with a hot air gun or dryer, to fix the hanger in position.

Another embodiment of this invention is a PSA article comprising a PSA layer of a partially oriented and partially crystalline elastomer, where the degrees of orientation and crystallinity of the elastomer are sufficient to impart tack and peel resistance which are relatively low in both directions (and much lower than that of a product of the same formulation in which the elastomer in the adhesive layer was non-oriented and non-crystalline).

An application of the above-described low-tack PSA article of the invention is as a pressure sensitive tape that does not need a low adhesion backsize (LAB) on the back side of the adhesive-coated tape backing. Such a tape is useful, for example, where it is desirable to print directly on the back side of the tape. Printing on many commercially available tapes currently involves a multi-step process wherein the LAB coating is partially or completely removed, the printing is applied to the back side of the tape using standard flexographic methods, and then an LAB is again applied over the printed surface. Since the PSA tape of the present invention can be made to have very low tack, the LAB can be eliminated and indicia can be printed directly on the tape backing. The tape can then be wound up again into a roll having low tack, or an LAB can be applied over the printed backing and the tape heated up to provide a printed tape having normal tack and peel. Similarly, the low-tack PSA tape of this invention may be used to produce linerless labels that can be printed in the low-tack state and then heated immediately before application to restore the tack and peel resistance. For example, a tape or label stock having low tack could be (1) fed to a station that would print the desired indicia on the backing by any conventional printing technique, (2) advanced past a heated roller or wire to increase the tack of the adhesive, (3) be cut off to form a label of the desired length, and (4) be directly applied to a substrate. If the printing in this process is accomplished by thermal printing, and it is desired to store the resulting product before use, then one must be sure that the temperature needed for printing should be less than that needed to melt the crystalline regions of the elastomer component of the PSA and relax orientation in the adhesive.

Another application of the low-tack PSA of the invention is in the manufacture of a PSA tape having tack so low that the surface of its adhesive layer will not stick to most other surfaces, but wherein the surfaces of the tape stick to each other. Surprisingly, the low-tack adhesive surface of this embodiment of the invention adheres aggressively to itself or another similar low-tack adhesive surface even though the adhesive surfaces are not tacky to the touch. Such a tape would be useful for a variety of fastening and sealing applications, such as, for example, diaper closures, sealing strips on envelopes and packages, clothing fasteners, and other applications where hook and loop fasteners are commonly used.

Another application of the low-tack PSA of the invention is in bundling operations where a number of elements are bound together by wrapping with adhesive tape, but wherein the bundling tape initially has low tack to allow some slip during the bundling, and the bundle is then heated to increase the holding ability so that slip is eliminated. Such a tape would be useful in wrapping cables, filaments, reinforcing fibers, and other elongate members.

The PSA article having low-tack oriented adhesive may also be treated by a zone heating technique to modify the PSA layer and impart a desired pattern thereto of spatially-variable tacky and nontacky regions or to impart different adhesive properties to different regions such as varying regular, random, or patterned zones of high and low tack. This modification (illustrated in FIGS. 9–11, described hereinafter) can be accomplished, for example, by placing a mask, such as clear polyethylene terephthalate film, on the exposed adhesive surface of a PSA article of this invention having low anisotropic peel force in the machine direction and directing infrared (IR) radiation toward the exposed face of the so-placed mask. The mask will have a desired array or pattern of laser-printed blackened features or zones which absorb the IR radiation, and transmit or reflect IR radiation through the non-blackened zones of the mask. The temperature of that portion of the PSA layer that lies beneath and in registry with the blackened zones of the mask is raised, e.g., to temperatures of 50° to 150° C. This causes thermal relaxation of the oriented, crystallized PSA elastomer component with a consequent increase in the tack of the so-heated portions of the PSA layer. The unwind noise of a PSA tape can be altered by spatially varying the tack of the adhesive. A PSA tape having such a patterned adhesive may also be used in security and tamper-evident applications wherein a predetermined pattern of adhesive could be left on the substrate when the tape is removed.

Additionally, selectively heating regions of the PSA layer to increase the tack could be an alternative to pattern coating an adhesive or selectively detackifying areas of an adhesive with varnishes or cover films. For example, "pouch tapes" used to form pockets that contain invoices or other documents on shipping cartons are currently made by coating the entire surface of the backing with adhesive, and then coating the center section with a varnish to deaden the adhesive everywhere except at the periphery of the pouch. Documents can then be placed in the center region, so that they do not contact the active adhesive at the periphery, and then the pouch is pressure-sealed to the shipping container by the exposed tacky adhesive at the edges of the pouch.

Alternatively, a pouch may be made from a low-tack PSA tape of the present invention. Documents can be placed directly against the low tack adhesive surface of the tape and positioned as desired on the shipping carton. The periphery of the pouch can then be heated, for example by a heated iron that limits heating to the peripheral edge where it is desired to increase the tack and peel of the adhesive.

Similarly, the low-tack PSA article of the present invention may be used as an alternative to pattern coating an adhesive, which often requires precise registration of the adhesive application. This is used, for example, in cover tapes for surface-mount component carrier tapes wherein it is desired that adhesive be present only at the outer edges of the cover tape so that it contacts only the side rails of the carrier tape and not the components which are held in the pockets of the carrier tape by the cover tape. It is difficult to obtain the precise registration of adhesive needed for this application, and often a blocker film is used down the center of the adhesive coated cover tape to ensure that the tacky surface of the adhesive does not contact electronic components that are held in the pockets of the carrier tape by the cover tape. Alternatively, the low-tack PSA of the present invention can be used on the entire surface of the cover tape, but then activated only at the edges by heat-sealing the cover tape to the side rails of the carrier tape. Similarly, a low-tack PSA of the present invention can be used in applications where pattern coating of the adhesive is needed by simply heat activating only those areas of the adhesive where sealing is desired.

Any of the natural rubbers which have heretofore been used or proposed for use as the elastomer component of natural rubber-based PSAs can be used to make the PSAs used in the practice of this invention. Uncured natural rubber is chemically unsaturated and an amorphous material in the unstressed or unstretched state and is subject to strain-induced orientation and crystallization (at least partially) of its molecules upon stretching. Natural rubber hydrocarbon is a 1,4-polyisoprene having essentially 100% cis structure and has little inherent tack (thus, it is preferably compounded with tackifying resin for PSA use). Commercial natural rubber products which can be used in making the PSAs of this invention are the visually graded rubbers known as ribbed smoked sheets and pale crepes, the technically specified rubbers, such as the SIR or SMR, and the controlled viscosity grades such as the CV60 version (which are described in Kirk-Othmer, *Encyclopedia of Polymer Sci. and Eng.*, Vol. 14, p. 692, John Wiley E. Sons, Inc., 1988, which description is incorporated herein by reference).

Polyisobutylene, also useful as the non-thermoplastic elastomer component of the PSAs of this invention, has little tendency to crystallize in the unoriented state but likewise is subject to orientation and strain-induced crystallization upon stretching. This elastomer has only terminal unsaturation. It has inherent tack at low molecular weight, though it is often compounded with tackifying resins to obtain the balanced PSA properties. Commercially available polyisobutylene products which can be used in this invention include those high molecular weight, normally solid products, such as Vistanex™ MM L-80. Low molecular weight polyisobutylene, such as Vistanex™ LMMS, can be used along with the high molecular weight version to contribute tack (see the description of Vistanex® Polyisobutylene in product bulletin SYN-76-1434 published by Exxon Chem. Co. U.S.A., which description is incorporated herein by reference).

Tackifying resins useful as components of the PSAs of this invention include those normally liquid or solid resins known to tackify natural rubber- and polyisobutylene-based PSAs. Those resins preferably have molecular weights that are relatively lower than the elastomer component and glass transition temperatures higher that the elastomer component. The main classes of tackifying resins useful herein include the known classes: wood rosin and its derivatives; petroleum based resins; and terpenes. The amount of the tackifying resin to be used will be that sufficient to impart the desired tack to the PSA, and that amount generally will be 10 to 400 parts, preferably 20 to 150 parts, by weight, per 100 parts by weight of elastomer. Particularly useful commercially available tackifying resins for tackifying natural rubber are Piccolyte™ S-115 terpene and Escorez™ 1310. Particularly usefull commercial petroleum-based resins useful in tackifying polyisobutylene-based PSAs are Escorez™ 1310 tackifiers.

Other adjuvants commonly used in rubber-based PSAs can also be included in the PSAs of this invention, such as antioxidants, e.g., Irganox™ 1010 tetrakis[methylene-3-(3', 5'-di-tert-butyl-4'-hydroxyphenyl)-propionate]methane, plasticizer oils, e.g., white mineral oil, elastomer oligomers, waxes, and inorganic fillers, e.g., talc, zinc oxide, titanium dioxide, aluminum oxide, and silica (see Satas, supra, Chap. II for a description of such adjuvants). Typically, the amount (on a weight basis, per 100 parts by weight of elastomer) of antioxidant to be used will be up to 5 parts, the amount of plasticizer will be up to 50 parts, preferably up to 20 parts, and the amount of filler will be up to 50 parts.

The materials which can be used as a backing or substrate for the PSA articles of this invention include those heretofore used for rubber-based PSA articles, including polymeric films, e.g., flexible polypropylene and polyester films, metallic foils, paper, ceramic films, and the like. Such backings can also comprise a plurality of fibers in a woven or nonwoven mat-like construction. The other side of the backing can be coated with a release coating or low adhesion backsize and the PSA layer can be covered with a release liner. Backings and release coatings or liners are described in Satas, supra, pp. 208–211, 585–600, which description is incorporated herein by reference.

EXAMPLES

The invention is illustrated in the following examples, but the particular materials and forms and amounts thereof, and the equipment and process conditions which are set forth in these examples, should not be construed to unduly limit this invention. In preparing the PSA articles of these examples, equipment like that illustrated in FIG. 1 was used. In these examples, the orientation and crystallization of the elastomer PSA components were measured at room temperature with a combination of techniques. The molecular weight of the natural rubber after processing in the mastication section of the extruder was measured in terms of inherent viscosity (IV). The tack and peel force of the PSA products were also measured. The techniques or methods of these measurements are as follows.

The optical birefringence measurements of the PSA showed evidence of orientation in that the PSA had different refractive indices for light polarized parallel to the machine direction compared to that for light polarized perpendicular to the machine direction.

The crystallinity of the elastomer in the PSA was detected by x-ray diffraction analysis. The degree of crystallinity was estimated from differential scanning calorimetry analysis and was determined to be low in these samples, viz., on the order of a few percent by weight of the elastomer.

Direct measurement of the PSA orientation was made using samples of PSA which were coated on the release side of a film which had been previously treated with a silicone release coating. Multiple layers of the adhesive were transferred from the release film to a clean glass slide (of microscope quality but larger in dimension) by applying the glass slide to the adhesive surface, trimming the adhesive around the edge of the slide with a razor blade, and lifting the slide. This process was repeated as many times as necessary to obtain the desired number of adhesive layers, maintaining the relative orientation of the slide and the coated adhesive each time. The slide was mounted on a sample holder on an optical bench.

The birefringence of the PSA samples was determined by adjusting the Babinet compensator so that its birefringence was equal and opposite to that of the sample, as indicated by the black line appearing in the center of the crosshairs of the compensator eyepiece. The birefringence of the sample was determined by the compensator setting, the wavelength of the light (546 nm), and the sample thickness following standard methods, such as described by White, J. L. et al. in *Encyclopedia of Polymer Science*, John Wiley & Sons, Vol. 10, p. 605, 1987. The definition of birefringence is the difference in refractive index of the sample for light polarized in two mutually perpendicular directions. In this patent specification, the birefringence value is the refractive index difference for light polarized parallel and perpendicular to the direction of preferred orientation.

Fourier transform attenuated total reflectance infrared (FT ATR-IR) dichroism measurements were performed on some of the PSA articles of this invention to measure the molecular orientation in the plane of the coating. The method is more fully described by F. Mirabella in *J. Applied Spectroscopy* 42(7), 1258–1265 (1988), and *J. Polymer Science*, Polymer Physics Edition 22, 1283–1304 (1984). The Nicollet 10-DX Fourier Transform infrared spectrometer that was used was fitted with an ATR attachment and a germanium (Ge) single diamond polarizer (Harrick, PSD-J1R). A Ge internal reflection element cut for a 45° incidence angle was placed at 22° from the normal to the beam after the polarizing element and before the detector. The crystal measured 50 mm×20 mm×3 mm thick. The actual incidence angle into the Ge crystal was calculated to be 39° due to refraction, corresponding to a 1 micron thick penetration depth of the infrared energy into the pressure-sensitive adhesive coating. We found that an absorption at 1130 cm$^{-1}$ was sensitive to orientation in the sample such that its absorption intensity was higher when the IR beam was polarized along the machine (or web) direction compared to when the beam was polarized along the transverse direction for samples having anisotropic peel adhesion and molecular orientation. The tape samples were directly adhered to both sides of the Ge crystal. The polarization of the incident IR beam was selected to be parallel to the plane of the adhesive coating. When a PSA sample was mounted with the electric field vector of the radiation parallel to the machine direction, the machine direction absorption spectrum was obtained. Conversely, when a sample was mounted with the electric field vector parallel to the cross-web direction, the cross-web absorption spectrum was obtained. The intensity of the 1130 $cm^{-1}$ band was measured as the peak height minus the baseline signal. This value was normalized by dividing this intensity by the intensity of the 1095 $cm^{-1}$ absorption (also having baseline signal subtracted) which is independent of orientation so that sample contact area artifacts for the MD and CD spectra could be factored out. For each spectrum, 50 scans for both background and sample were averaged. For each sample, the relative absorptance of the 1130 $cm^{-1}$ band for both machine and cross-web directions was measured. The "IR anisotropy" is defined as the ratio of the normalized absorptance of the 1130 $cm^{-1}$ band for IR radiation polarized in the machine direction to the absorptance for radiation polarized in the cross direction.

The resistance of a PSA tape to peeling under a constant load was measured by the test referred to as adhesion at constant angle and stress (ACAS) which is a variation of PSTC 14 (Pressure Sensitive Tape Council, Glenview, Ill.). The static load peel resistance of the tapes was tested in the following manner. A strip of tape 0.75 inch (1.9 cm) wide was cut with a razor cutter and applied to a polished stainless steel panel. For some of the testing, a quartz substrate was used instead of stainless steel. The panels were cleaned between uses by washing once with diacetone alcohol and then three times with heptane, wiping with Kimwipe™ sheets each time. The tape was rolled down onto the panel with a 4.5 lb (2 kg) rubber-coated roller 4 inches (10 cm) in diameter using two passes at approximately 12 in/min(30.5 cm/min). A wire hook was affixed to one end of the tape strip. The panel was mounted horizontally with the tape on the bottom side. A 200 g weight was hung from the hook and the peel rate was determined by measuring the time to peel the 3-inch (7.6 cm) length of the panel. The peel resistance was calculated as the inverse peel rate in min/in. Replicate measurements were made and the peel resistance values averaged. The results using this test method are referred to herein as ACAS1. Alternatively, the aforementioned test was run using quartz plate as a substrate instead of stainless steel and the alternative test results are referred to herein as ACAS2.

The peel strength at fixed peeling speed was also measured using an Instron™ universal test machine. A 1-inch (2.54 cm) wide strip of tape was cut and applied to a flat glass plate. The strip was rolled down with two passes of a 4.5 lb (2 kg) rubber covered roller as in the holding power measurements described above. The glass plate with attached sample was mounted horizontally in a sliding jig on the Instron machine. A cord attached to the front edge of the sliding plate was threaded through a pulley and attached to the crosshead. The tape tab was clamped in the grips attached to the force transducer in the moving crosshead. The tape was peeled by moving the crosshead up at a constant speed of 12 in/min (3.5 cm/min). This arrangement allowed for 90° peel of the tape while maintaining the peel front directly below the crosshead. The average peel force during the peeling was determined. The peel strength is expressed as the force divided by the width of the tape. The results of this test are referred to herein as PL1.

Another peel strength test was used for some of the testing. In this further test, a piece of biaxially-oriented polypropylene (BOPP) film was applied to a stainless steel test panel with double-sided PSA tape. The PSA tape product of this invention to be tested was slit to a 1-inch (2.54 cm) width and then applied to the BOPP film and rolled down as described in the above-described PL1 test. The tape was peeled by the Instron machine with a 180° peel angle with a crosshead speed of 12 in/min (30.5 cm/min). The average peel force was measured and the peel strength calculated as the peel force divided by the tape width. The results of this test are referred to herein as PL2.

A third type of peel test was conducted by applying a 1 inch (2.54 cm) wide strip of the PSA tape of this invention to a glass substrate, rolling and peeling at a peel angle of 180° and a peeling speed of 90 inches/min (228.6 cm/min). The results of the test are referred to herein as PL3. The same test method was run at a peel rate of 12 inches/min (30.48 cm/min) and the results are referred to herein as PL4.

Tack was measured by the rolling ball test method described in PSTC 6. A strip of adhesive tape was mounted, adhesive side up, at the base of an inclined plane. A stainless steel ball was released from the top of the inclined plane and the distance it traveled on the adhesive surface before stopping was measured. Results are averages of two measurements. The results of this test are referred to herein as RBT.

The molecular weight of the natural rubber after processing in the mastication zone of the extruder was sometimes characterized using inherent viscosity (IV) measurements. This technique is well known in the polymer science art. A sample of the rubber was removed from the extruder at the tackifier addition port with the tackifier addition turned off. This sample was dissolved in toluene and diluted to a concentration of 0.15 g/dl±0.02 g/dl. The diluted solution was centrifuged to remove insoluble components. A 10 ml portion of the solution was transferred to a Cannon-Fenske glass capillary viscometer. The viscometer and solution were equilibrated for 5 min in a water bath maintained at 25° C. The solution was then drawn up in the viscometer to the indicated mark with a squeeze bulb and allowed to flow through the capillary of the viscometer. The time for the solution to flow through was measured with a stopwatch. This procedure was repeated for a sample of the pure solvent in the same viscometer. The precise polymer concentration was determined by delivering 20 ml of solution with a pipette to a preweighed aluminum drying dish. The solution was placed in an oven at 100° C. for 2 hours. The remaining polymer weight was then determined. All weights were determined using an analytical balance with 0.1 mg resolution. The IV (inherent viscosity) was calculated by the following relation:

$$IV = \ln\left(\frac{t_{solution}/t_{solvent}}{c}\right)$$

wherein:
$t_{solution}$ is efflux time for the polymer solution
$t_{solvent}$ is efflux time for the solvent
c is polymer concentration (g/dl)
ln is natural logarithm.

Examples 1–4 and Comparison Example A

All of these examples were produced with a single adhesive formulation and fixed extruder conditions. The formulation consisted of the following components:

| Component | Parts by weight |
|---|---|
| Natural rubber (ribbed smoked sheet) | 100 |
| Piccolyte ™ S-115 tackifier | 65 |
| Irganox ™ 1010 antioxidant | 1 |

The natural rubber, supplied by Goodyear Chemical Plantation Division, was ground and fed to the extruder at a rate of 68.4 g/min. The Piccolyte™ S-115 tackifier was ground and dry blended with Irganox™ 1010 antioxidant at a weight ratio of 65/1 Piccolyte™ S-115/Irganox™ 1010, and this blend was fed at a rate of 45.1 g/min to the extruder at a second addition port downstream of the rubber addition. The extruder screw configuration shown in FIG. 2 was used along with air injection to the rubber mastication zone. The screw speed was 475 rpm and temperature in the mastication zone was 172° C. Under these conditions, the rubber IV was 2.0 dl/g. The line speed was 60 ft/min (18.3 m/min) and the adhesive melt temperature at the die was 100° C. A contact type die was used with a rubber lip in conjunction with a chromed steel backup roll as shown in FIG. 1.

The quick cooling of the PSA extrudate was effected with a backup roll having a diameter of 30 cm and a circumference of 94 cm. The roll interior was maintained in Examples 1–4 at temperatures of 15° to 50° C. using circulating water. In Comparison Example A, the backup roll interior temperature was 70° C. In all examples, a biaxially oriented polyethylene terephthalate film (30 $\mu$m in thickness) was used as a backing and was coated with the PSA extrudate at a thickness of 40 $\mu$m. For each example the same conditions were also used to make a second sample by coating the same PSA extrudate on a backing of 50 $\mu$m thick polyester film having a silicone release coating on the side to which the adhesive was applied. This second sample was produced so that the adhesive could be transferred to a glass slide for measurements of the elastomer orientation by birefringence. Test results on the adhesive and tape prepared in this way are shown below in Table 1.

direction (MD), the higher anisotropy correlating with greater orientation. In contrast, in preparing the PSA of Comparison Example A, using a higher backup roll temperature, 7020 C., the consequent, relatively slow cooling of the PSA extrudate resulted in little or no orientation and crystallization of the elastomer, as shown by the birefringence and infra-red dichroism data of Table 1. The peel resistance values for the machine and cross directions for the Comparative Example A do not appreciably differ or are nearly the same, indicating very low or essentially no adhesion anisotropy. The rolling ball tack data demonstrate that, at high degrees of orientation, the tack is reduced substantially.

The PSA prepared under the conditions for Example 2 was coated on a release liner and transferred to glass for x-ray diffraction analysis. The results showed two diffraction peaks (which were not present in the spectrum from Comparative Example A) which were at diffraction angles matching those reported in the literature for crystallized natural rubber. Differential scanning calorimetry (DSC) analysis of this adhesive showed an endothermic peak at 52° C. with a heat of fusion of 0.2 cal/g of adhesive. With the literature value of the heat of melting of rubber crystals given as 16.1 cal/g crystals, approximately 2% of the elastomer in the PSA of Example 2 was calculated to be crystalline.

Example 5

A sample of the PSA article prepared in Example 1, affixed to a glass slide, was mounted in the birefringence setup described earlier. The PSA layer of the article was heated with a heat gun to a temperature of about 80° C. for 1 minute and the birefringence fell to less than $0.01 \times 10^{-3}$. The sample felt substantially tackier to the touch after heat treatment than it did before heating, demonstrating that the oriented, crystallized state of the elastomer of the PSA can be eliminated by heating to a temperature above the melting point of the oriented, crystalline phase of the elastomer.

Example 6

A portion of the PSA tape of Example 2 was applied to a release liner and aged in an oven at 65° C. for 5 min. Another portion of the same tape was applied to the same release liner and kept at room temperature (ca 20° C.). The two portions were then tested for peel resistance by the ACAS1 method. The two portions of so-treated tapes were then tested and the results are shown in Table 2.

TABLE 1

| Ex. No. | Coating roll temp., °C. | Birefringence $\Delta n \times 10^3$ | Rolling ball tack, RBT, cm | ACAS1 sec/cm (min/in) MD | ACAS1 sec/cm (min/in) CD | ACAS2 sec/cm (min/in) MD | ACAS2 sec/cm (min/in) CD | PL2 N/cm (lb/in) MD | PL2 N/cm (lb/in) CD | Anisotropy IR |
|---|---|---|---|---|---|---|---|---|---|---|
| 1 | 15 | 1.4 | 6.2 | 0.7 (0.03) | 43 (1.8) | 0.2 (0.01) | 66 (2.8) | 0.11 (0.06) | 1.05 (0.60) | 2.3 |
| 2 | 30 | 1.9 | 2.2 | 0.7 (0.03) | 83 (3.5) | —* | — | — | — | 2.2 |
| 3 | 40 | 0.32 | 2.1 | 1.9 (0.08) | 40 (1.7) | 1.4 (0.06) | 54 (2.3) | 0.12 (0.07) | 2.50 (1.43) | 1.8 |
| 4 | 50 | 0.22 | 1.5 | 28 (1.2) | 52 (2.2) | — | — | — | — | 1.1 |
| A | 70 | 0.02 | 1.4 | 99 (4.2) | 135 (5.7) | 118 (5.0) | 139 (5.9) | 2.50 (1.43) | 2.45 (1.40) | 1.0 |

*The dashes in Table 1 mean the values were not measured.

Both the birefringence and infra-red dichroism data of Table 1 show that there is significant molecular orientation of the elastomer in the PSAs of this invention, Examples 1–4, which were prepared by cooling the PSA extrudate at 15°–50° C. The peel resistance data of Table 1 (under the headings ACAS1, ACAS2, and PL2) for the PSA articles of Examples 1–4 are values that are greater by significant amounts in the cross direction (CD) than in the machine

TABLE 2

| | ACAS1, sec/cm (min/in) | |
|---|---|---|
| Treatment | MD | CD |
| Kept at room temperature, ca 23° C. | 0.7 (0.03) | 83 (3.5) |
| Heated at 65° C. | 1800 (75)* | 1800 (75)* |

*tape cohesively split

The data of Table 2 show that the oriented, crystallized state of the elastomer of the anisotropic PSA of this invention can be elimninated by heat treatment, resulting in an increase in peel resistance and loss of the anisotropic peel properties.

Examples 7 and 8

For these examples, the extruder screw configuration used was the same as illustrated in FIG. 2. The screw speed was 400 rpm and the air injection port was closed. For these examples a controlled viscosity grade of natural rubber, SMR CV60, available from Goodyear Chemical Plantation Division, was used. Piccolyte™ S-115 tackifying resin was fed to extruder zones 5 and 7 and, in Example 7, white mineral oil was added to the vent port in zone 9. The rubber IV under the operating conditions of this experiment was measured to be 3.5 dl/g.

For Example 7, natural rubber CV-60 was pelletized with a Moriyama extrusion pelletizer and dusted with talc. The rubber pellets were fed to zone 1 of the twin screw extruder at a rate of 68.4 g/min. Ground Piccolyte™ S-115 tackifying resin which had been preblended with Irganox™ 1010 antioxidant at a ratio of 15/1 Piccolyte™/Irganox™ was added at a rate of 10.9 g/min to zone 5. Undiluted Piccolyte™ S-115 was added at a rate of 44.5 g/min to zone 7. White mineral oil was added at a rate of 13.7 g/min to zone 9. The resulting formulation was as follows.

| Component | Parts by weight |
|---|---|
| Natural rubber CV-60 | 100 |
| Piccolyte ™ S-115 tackifier | 80 |
| Mineral Oil | 20 |
| Irganox ™ 1010 antioxidant | 1 |

The PSA temperature at the coating die was 100° C. The same coating die and roll were used as in Examples 1–4. The fluid circulating through the backup roll was controlled at 40° C. The line speed was 60 ft/min. (18.3 m/min). The adhesive was coated at a thickness of 50 μm onto the same polyester film as used in Examples 1–4. The properties of the tape are shown in Table 3.

For Example 8, the same conditions were used as in Example 7 except that the feed rate of Piccolyte™ S-115 to zone 7 was 34.2 g/min and no oil was added in zone 9. The formula for the PSA of Example 8 was as follows.

| Component | Parts |
|---|---|
| Natural Rubber CV-60 | 100 |
| Piccolyte ™ S-115 tackifier | 65 |
| Irganox ™ 1010 antioxidant | 1 |

The line speed was 30 ft/min. (9.1 m/min). The fluid circulating to the backup roll was controlled at 40° C. The adhesive was coated at 50 μm onto a crepe paper masking tape backing approximately 100 μm thick. The tape test results are shown in Table 3.

TABLE 3

| Example | PL1 (MD), N/cm (lb/in) | PL1 (CD), N/cm (lb/in) | ACAS1 (MD), sec/cm (min/in) | ACAS1 (CD), sec/cm (min/in) |
|---|---|---|---|---|
| 7 | 0.5 (0.3) | 2.8 (1.6) | 2 (0.1) | 45 (1.9) |
| 8 | 0.9 (0.5) | 2.1 (1.2) | 0.7 (0.03) | 4.2 (0.18) |

The data of Table 3 show that the anisotropic peel properties can be achieved with these alternate formulations and backings.

Examples 9–13

For these examples, the extruder configuration shown in FIG. 2 was used along with a rotary rod die and a rubber-covered backup roll. The air injection port of the extruder was closed and the screw speed was 300 rpm. The rubber surface of the backup roll was cooled by contact with a chill roll and the surface of the adhesive was further cooled using either a water spray or a stream of cold nitrogen gas and liquid as shown in FIG. 1. The nitrogen cooling was provided by supplying liquid nitrogen to a copper manifold with holes drilled in it. The liquid nitrogen partially evaporated in the transfer hose and the manifold, producing a stream of cold nitrogen gas accompanied by a slow drip of liquid nitrogen onto the contact point between the die and the web. The water spray was produced by supplying water at a metered rate to a set of needles arranged in line approximately 0.25 in. (0.67 cm) apart. Compressed air was used to direct two impinging air streams from a manifold such that they met at the line of needle tips, atomizing the water and carrying the spray toward the web immediately downstream of the die. The adhesive was coated at a thickness of 40 μm on polyester film backings of various thicknesses. The line speed was 30 ft/min. (9.1 m/min). The adhesive temperature at the die was 150° C.

For Example 9, the adhesive formulation was as follows.

| Component | Parts by weight |
|---|---|
| Natural rubber CV-60 | 100 |
| Piccolyte ™ S-115 tackifier | 65 |
| Irganox ™ 1010 antioxidant | 1 |

The natural rubber was added at 68.4 g/min to extruder zone 1, undiluted Piccolyt™ S-115 was added at 13.7 g/min to zone 5, and a blend consisting of 45/1 Piccolyte™ S-115/Irganox™ 1010 was added at 31.5 g/min to zone 7. Chilled water at a temperature of 15° C. was circulated to the chilled nip roll. The water circulating through the rubber covered backup roll was at 25° C. No chilled nitrogen gas or water spray was used for this example. The adhesive was coated onto a 100 μm thick biaxially-oriented polyethylene terephthalate (PET) film.

For Example 10, the same conditions were used as for Example 9 except that the liquid nitrogen cooling system was used for quickly cooling the PSA extrudate.

For Example 11 the same conditions were used as for Example 9 except that Escorez™ 1310 tackifying resin was substituted for Piccolyte™ S-115 product and the adhesive was coated on 50 μm thick PET film.

For Example 12 the same conditions were used as for Example 11 except that the liquid nitrogen cooling system was used to effect the quick cooling.

For Example 13 the same conditions were used as for Example 11 except that the water spray cooling system was used to effect the quick cooling.

The tape properties of Examples 9–13 are set forth in Table 4.

TABLE 4

| Example No. | PL3 (MD), N/cm (lb/in) | PL3 (CD), N/cm (lb/in) |
|---|---|---|
| 9 | 1.42 (0.81) | 2.05 (1.17) |
| 10 | 0.26 (0.15) | 1.56 (0.89) |
| 11 | 2.40 (1.37) | 3.12 (1.78) |
| 12 | 0.19 (0.11) | 3.59 (2.05) |
| 13 | 0.18 (0.10) | 3.01 (1.72) |

The data of Table 4 show that in making PSA tapes with relatively thick backings on the rubber-covered backup roll, cooling from the backup roll alone did not provide a high degree of anisotropy. However, the use of liquid nitrogen or water cooling can provide the desired degree of orientation and anisotropy.

Example 14

For Example 14 and Comparative Example B, the extruder and coating station setups of Examples 9–13 were used. The fluid circulating through the rubber-covered backup roll was controlled at 20° C. The chilled roll cooling the surface of the backup roll was cooled with water at 15° C. The liquid nitrogen cooling system was used with the addition of a second manifold to cool the web prior to coating. The adhesive had the following formulation.

| Component | Parts by weight |
|---|---|
| Vistanex ™ MML-80 polyisobutylene | 62.8 |
| Vistanex ™ LMMS polyisobutylene | 20.0 |
| Escorez ™ 1310 tackifing resin | 33.7 |
| White mineral oil | 10.0 |
| Irganox ™ 1010 antioxidant | 0.6 |

The Vistanex™ MM L-80 polyisobutylene was pelletized in the same way as the CV60 natural rubber for the earlier examples and fed to extruder zone 1. The Vistanex™ LMMS polyisobutylene is a low molecular weight product which is a very viscous liquid. This material was heated and pumped to zone 5 of the compounding device using and heated pail unloader. The Escorez™ 1310 resin was fed to zone 7 and the mineral oil was metered into zone 9 using a gear pump. The antioxidant was preblended with the tackifying resin and fed along with it. The adhesive was coated at a thickness of 40 µm onto a PET backing 50 µm in thickness. The line speed was 30 ft/min. (9.1 m/min). The resulting tape properties are listed in Table 5.

Comparative Example B

The same conditions were used as in Example 14 except that Exxon Butyl 077 rubber was substituted in the adhesive formulation for Vistanex™ MM L80 polyisobutylene. The tape properties of this comparative example are also set forth in Table 5.

TABLE 5

| Example No. | PL4 (MD), N/cm (lb/in) | PL4 (CD), N/cm (lb/in) |
|---|---|---|
| 14 | 0.18 (0.10) | 4.89 (2.79) |

TABLE 5-continued

| Example No. | PL4 (MD), N/cm (lb/in) | PL4 (CD), N/cm (lb/in) |
|---|---|---|
| Comparative B | 6.78 (3.87) | 6.31 (3.60) |

The data of Table 5 show that the polyisobutylene-based adhesive had strong peel anisotropy in that the MD peel force was less than 4% of the CD peel force, but the butyl rubber-based material produced under identical conditions did not. The CD peel force is slightly lower than the MD peel force in this case at 93% of the MD value. The difference between Example 14 and Comparative Example B may be attributed to the fact that the small amount of isoprene comonomer in the Butyl 077 rubber prevents crystallization of the rubber.

Example 15

A tape made according to Example 10 was cut to approximately six inches (15.2 cm) in length. Approximately one-half of the width of the tape was masked to allow heating of only a portion of the adhesive so as to selectively melt the crystallinity and relax the orientation of the elastomer and thereby selectively alter the tack of the adhesive. The rolling ball tack (RBT) of the tape sample prior to any masking or selective heating was 68 mm.

A mask was then prepared. More specifically, a pattern was laser printed on paper such that one-half of the paper was printed black and one-half remained unprinted. The paper was then fed through a Thermofax™ photocopying machine with an infrared transparency film, which darkens by absorbing infrared energy in the machine selectively in those areas which are dark on the paper. This resulted in a patterned transparency film mask which was half dark and half transparent.

The PSA tape (comprising an elastomer having a partially oriented and partially crystalline component) was than applied to the patterned transparency film mask so that one-half of the tape in the longitudinal direction overlapped the dark patterned region of the transparency, and one-half overlapped the clear unpatterned region. In order to further protect the unmasked area of the PSA tape from the effects of infrared absorption, a white tape that did not significantly absorb infrared energy was laminated over the clear unpatterned area of the transparency film mask and to the back of the PSA tape in the area which overlapped the clear unpatterned region of the transparency film mask. The laminate was fed through the Thermofax™ machine again, with the machine at a setting of 6, causing local heating of the adhesive in the area that overlapped the dark pattern on the transparency film.

The rolling ball tack (RBT) of each side of the tape sample was measured and found to be 38 mm for the unmasked side, and 11 mm for the masked, heated side of the tape. From these data, it appears that some heating and concurrent melting of the oriented crystalline component of the elastomer occurs even in the unpatterned regions due to generalized heating within the Thermofax™ machine.

Example 16

A second six inch (15.2 cm) tape sample made according to Example 10 was masked to allow heating in a spatially varying pattern to give a pattern of alternating high and low tack. Prior to any masking or selective heating, the rolling ball tack (RBT) of the tape sample was measured at 68 mm.

Figure 10:

A pattern as shown in FIG. 10 was produced using a computer drawing program and printed on paper with a laser printer. The paper was then fed through a Thermofax™ photocopying machine with an infrared transparency film as described in Example 15 to form a transparency film mask patterned with alternating dark and transparent lines as shown in FIG. 10. The PSA tape (comprising an elastomer having a partially oriented and partially crystalline component) was than applied to the patterned transparency film mask with the maskant lines perpendicular to the longitudinal direction of the tape. The laminate was fed through the Thermofax™ machine again, with the machine at a setting of 4, causing local heating of the adhesive in the areas that overlapped the dark lines on the transparency film. The rolling ball tack (RBT) of the selectively heated tape sample was measured at 10 mm, with the tack measured across (perpendicular to) the alternating heated and unheated regions of the elastomer.

Examples 17–20

A PSA tape was prepared using the same extruder screw configuration, coating roll, and die setup used in Examples 1–4. The rubber used was SMR CV60 natural rubber, and the PSA formulation of Examples 17–20 was as follows:

| Component | Parts by weight |
| --- | --- |
| Natural rubber | 100 |
| Piccolyte ™ S-115 | 50 |
| Irganox ™ 1010 | 1 |

The coating roll temperature was controlled at 30° C., and the tape produced had relatively low tack and high peel anisotropy.

Figure 8:
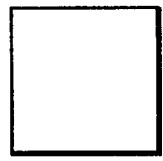
FIGS. 8–11 are schematic top or plan views illustrating PSA products of this invention and in which FIGS. 9–11 have patterns of spatially-variable regions of different pressure-sensitive tack.
Figure 9:
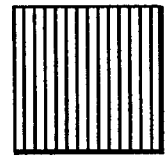

The PSA tapes of Examples 17–20 were exposed to heat in a spatially-varying pattern to selectively melt the crystallinity and relax the orientation of the elastomer. By varying the shape of the heating pattern, the unwind characteristics of the tape could be varied. To accomplish the heating, the desired pattern was produced as described in Example 16, except using the patterns shown in FIGS. 9–11 and in Table 6 below. FIG. 9 shows a tape sample made from a maskant having alternating dark and transparent regions which run parallel to the machine direction of the tape, and FIG. 10 shows a tape sample made from a maskant having alternating dark and transparent regions which run perpendicular to the machine direction of the tape. FIG. 8 is a control sample which corresponds to an unpatterned, relatively low tack tape sample that was not selectively heated to vary its unwind characteristics.

The tapes were peeled at a speed of 100 in/min (254 cm/min) to characterize the noise levels of the tapes during unwind. The characteristics are shown in Table 6.

TABLE 6

Figure 11:
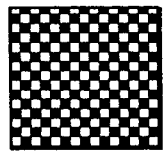

| Example No. | Pattern | Noise characteristics |
| --- | --- | --- |
| 17 | FIG. 8 | low peel adhesion, raspy |
| 18 | FIG. 9 | smooth peel, quiet |
| 19 | FIG. 10 | shocky peel, raspy |
| 20 | FIG. 11 | smooth peel, quiet |

From these data, it is apparent that the peel characteristics and unwind noise levels can be altered by spatially varying the tack of the adhesive.

Example 21

An anisotropic PSA tape was made by the same conditions as in Example 10 with the exception that the PSA was coated on 50 μm thick polyester film. The adhesion of the PSA tape measured by the PL3 method was found to be 0.15N/cm when peeled in the machine direction and 4.40N/cm in the cross direction. A sheet of this tape was used as an application tape to transfer die cut letters from a silicone release liner, similar to that illustrated in FIGS. 4–7. Letters approximately 1.2 cm in height were die cut from a vinyl graphic Controltac® film and the waste vinyl material removed from the space between the letters. The tape was applied to the surface of the die cut letters on the release liner and rubbed down. The application tape was then peeled in the cross direction (the high-adhesion direction). The high adhesion exhibited by the application tape in this direction ensured that all of the letters would be lifted from the release liner and held securely to the application tape. The application tape and its attached die cut letters were then applied to the target substrate and rubbed down. The application tape was then removed by peeling in the machine direction (the low-adhesion direction). The low peel force of the tape when peeling in this direction ensured that all of the letters remained bonded to the target substrate and the application tape was easy to remove.

Various modifications and alterations of this invention will become apparent to those skilled in the art without departing from the scope and spirit of this invention.

What is claimed is:

1. A process for preparing a pressure-sensitive adhesive comprising a partially oriented and partially crystallized elastomer, which process comprises providing a normally solid elastomer capable of strain-induced crystallization, masticating said elastomer, optionally, blending said masticated elastomer with a tack-inducing additive, heating said masticated elastomer, shaping said masticated and heated elastomer to induce partial orientation therein, and cooling said shaped elastomer to a temperature below the melt temperature of the partially oriented elastomer at a rate so as to induce partial crystallization and maintain said partial orientation in said elastomer induced by the strain of said shaping.

2. A process for preparing a pressure-sensitive adhesive article comprising a substrate and a pressure-sensitive adhesive layer thereon, wherein the pressure-sensitive adhesive comprises a partially oriented and partially crystallized elastomer, which process comprises providing a normally solid elastomer capable of strain-induced crystallization, masticating said elastomer, optionally, blending said masticated elastomer with a tack-inducing additive, heating said masticated elastomer, shaping said masticated and heated elastomer to induce partial orientation therein, depositing said shaped elastomer on a substrate, and cooling said shaped elastomer to a temperature below the melt temperature of the partially oriented elastomer at a rate so as to induce partial crystallization and maintain said partial orientation in said elastomer induced by the strain of said shaping.

3. The process according to claim 2 wherein said substrate is a backing, and said shaping is accomplished by extruding and depositing said elastomer onto said backing.

4. A process of bonding one or more substrates or objects, which process comprises applying to the surfaces thereof a pressure-sensitive adhesive comprising a partially oriented and partially crystallized elastomer, wherein partial orientation in said elastomer is displayed when measured by optical birefringence, infrared dichroism or x-ray diffraction and partial crystallization in said elastomer is displayed when measured by differential scanning colorimetry or x-ray diffraction.

5. A process of transferring one or more objects from one location to another location, which process comprises applying to the surfaces of said objects a pressure-sensitive adhesive article comprising a substrate and a pressure-sensitive adhesive layer thereon, wherein the pressure-sensitive adhesive article comprises a partially oriented and partially crystallized elastomer, wherein partial orientation in said elastomer is displayed when measured by optical birefringence, infrared dichroism or x-ray diffraction and partial crystallization in said elastomer is displayed when measured by differential scanning colorimetry or x-ray diffraction, said substrate is a backing, and said pressure-sensitive adhesive layer is coated on said backing, and transferring the resulting loaded product to the other location.

6. A process according to claim 1, wherein the partial orientation in said elastomer is displayed when measured by optical birefringence, infrared dichroism or x-ray diffraction.

7. A process according to claim 6, wherein the partial crystallization in said elastomer is displayed when measured by differential scanning calorimetry or x-ray diffraction.

8. A process according to claim 1, wherein the partial crystallization in said elastomer is displayed when measured by differential scanning calorimetry or x-ray diffraction.

9. A process according to claim 1, wherein said elastomer comprises natural rubber.

10. A process according to claim 1, wherein said elastomer comprises polyisobutylene.

11. A process according to claim 1, wherein said masticated elastomer is blended with a tack-inducing additive.

12. A process according to claim 2, wherein said substrate is a backing, and said shaping is accomplished by extruding and depositing said elastomer onto said backing.

13. A process according to claim 2, wherein the partial orientation in said elastomer is displayed when measured by optical birefringence, infrared dichroism or x-ray diffraction.

14. A process according to claim 2, wherein the partial crystallization in said elastomer is displayed when measured by differential scanning calorimetry or x-ray diffraction.

15. A process according to claim 2, wherein said adhesive layer has anisotropic peel force.

16. A process according to claim 2, wherein said article is in the form of a tape, wherein said substrate is a backing and said pressure-sensitive adhesive layer is coated on the backing.

17. A process according to claim 2, wherein the cooling is provided by transfer of heat from said elastomer to said substrate.

18. A process according to claim 2, wherein said elastomer is blended with a tack-inducing additive.

19. A process according to claim 4, wherein said pressure-sensitive adhesive is in the form of a graphic applications tape.

20. A process according to claim 5, wherein said pressure-sensitive article comprises a graphic applications tape.

21. A process according to claim 5, wherein the step of transferring the resulting loaded product comprises removing said pressure-sensitive layer from said substrate by pulling said pressure-sensitive layer in a low adhesion direction.

* * * * *